US006893340B1

(12) United States Patent
Schmidt et al.

(10) Patent No.: US 6,893,340 B1
(45) Date of Patent: May 17, 2005

(54) ROTARY ACCELERATING APPARATUS FOR A VERTICAL STRAW AND CHAFF SPREADER OF AN AGRICULTURAL COMBINE

(75) Inventors: James R. Schmidt, Blue Grass, IA (US); Jonathan E. Ricketts, Viola, IL (US)

(73) Assignee: CNH America LLC, Racine, WI (US)

( * ) Notice: Subject to any disclaimer, the term of this patent is extended or adjusted under 35 U.S.C. 154(b) by 39 days.

(21) Appl. No.: 10/731,664

(22) Filed: Dec. 9, 2003

(51) Int. Cl.⁷ .............................................. A01F 12/30
(52) U.S. Cl. ........................ 460/111; 460/112; 239/650
(58) Field of Search ........................ 460/111, 112, 113; 56/71; 239/650, 667, 672

(56) References Cited

U.S. PATENT DOCUMENTS

| 1,770,707 | A |   | 7/1930 | McDow |   |
|---|---|---|---|---|---|
| 4,442,979 | A |   | 4/1984 | Küpper | 239/656 |
| 4,510,883 | A |   | 4/1985 | Estes | 118/305 |
| 4,591,102 | A |   | 5/1986 | Clarke | 239/655 |
| 5,797,793 | A | * | 8/1998 | Matousek et al. | 460/111 |
| 6,209,808 | B1 |   | 4/2001 | Anderson | 239/682 |
| 6,343,986 | B1 |   | 2/2002 | Hofer | 460/111 |
| 6,406,368 | B1 |   | 6/2002 | Cruson et al. | 460/111 |
| 6,508,419 | B1 |   | 1/2003 | Kinkead et al. | 239/668 |
| 6,572,035 | B1 | * | 6/2003 | Pfeiffer | 239/650 |
| 6,616,528 | B2 | * | 9/2003 | Wolters et al. | 460/111 |
| 6,719,627 | B2 | * | 4/2004 | Wolters et al. | 460/111 |

* cited by examiner

Primary Examiner—Árpád Fábián Kovács
(74) Attorney, Agent, or Firm—Brant T. Maurer; Rebecca Henkel

(57) ABSTRACT

Rotary accelerating apparatus for a vertical crop residue spreader of an agricultural combine capable of receiving, combining and accelerating a relatively high velocity of voluminous flow of relatively heavy, bulky crop residue including straw and the like deflected downwardly from the thresher of the combine, and a weaker, less voluminous flow of chaff and air from the cleaning system of the combine located forwardly of the spreader, by generating a negative pressure or suction condition in the vicinity of the chaff flow for overcoming any undesirable back pressure condition that interferes with induction of the crop residue flow from the cleaning system and which facilitates air flow through the chassis region of the combine to reduce conditions leading to undesirable dust buildup and other problems.

13 Claims, 8 Drawing Sheets

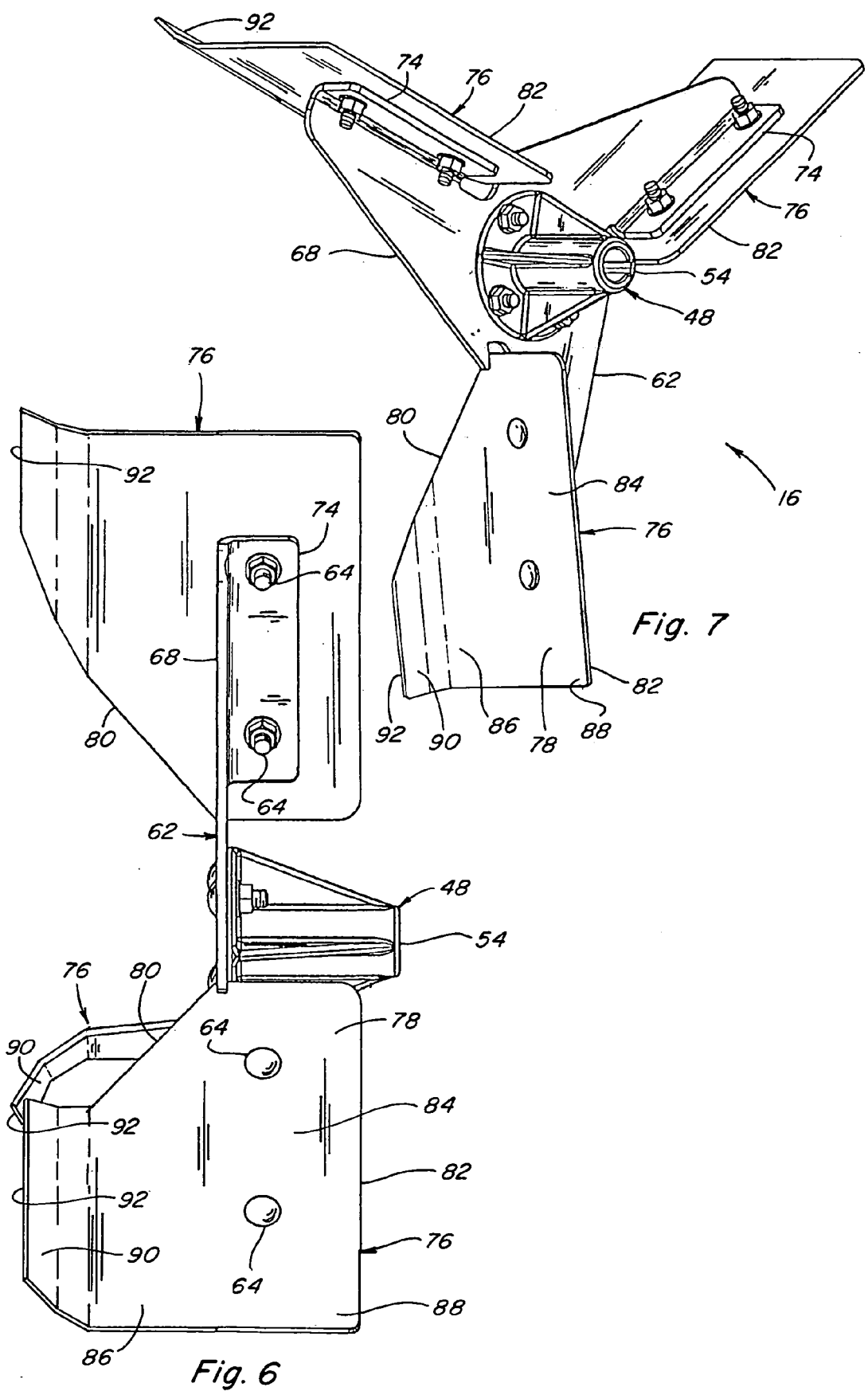

ROTARY ACCELERATING APPARATUS FOR A VERTICAL STRAW AND CHAFF SPREADER OF AN AGRICULTURAL COMBINE

TECHNICAL FIELD

This invention relates generally to a vertical straw and chaff spreader for an agricultural combine, and more particularly, to rotary crop residue accelerating apparatus for a vertical spreader including blades having features for improving induction of chaff and air into the spreader from a cleaning system of the combine and improving air flow through the combine chassis, for mixing with a flow of heavier straw from above and accelerating and discharging the mixture sidewardly from the spreader.

BACKGROUND ART

Rotary crop residue spreaders for agricultural combines are well known in the art. Commonly, such spreaders are of the horizontal type, that is, they include one or more horizontal disks supported for rotation about an axis oriented vertically or at a small acute angle to vertical, and a plurality of radially extending blades attached to an upper surface of the disk for receiving straw from the threshing system of the combine and/or chaff from the cleaning system and directing a flow of the residue sidewardly and/or rearwardly from the spreader. Reference in this regard, the spreaders shown in U.S. Pat. Nos. 6,406,368; 6,343,986; and 6,209,808. Reference also U.S. Pat. No. 4,591,102 which discloses a horizontal chaff spreader including blades rotatable in a horizontal plane above a base plate for receiving crop residue blown and/or dropped from above and accelerating and discharging the residue through sidewardly directed chutes. An advantage of the known horizontal crop residue spreaders is that the crop residue, be it straw and/or chaff, essentially falls from above into the spreader such that induction and mixing of the crop residue for acceleration and discharge from the spreader is not problematic. However, a disadvantage of the known horizontal type crop residue spreaders such as those disclosed above, include that they have a relatively large forward to rearward horizontal extent, and must be located beneath an outlet or other pathway of crop residue from the spreader, for instance, a rear opening to a cleaning system of the combine, so as to make access to the cleaning system and other components in the rear of the combine inconvenient and more difficult than is desirable.

To overcome the above referenced disadvantages, it is desired to utilize a vertical spreader, that is, one including accelerating apparatus or elements that rotate in a vertical plane, or a plane oriented at only a small acute angle to vertical, about a rotational axis oriented horizontally or at a small acute angle to horizontal generally less than about 45 degrees, and located in a rear opening of a combine. It is also desired for the spreader to be to movable away from the opening to allow access to the cleaning system and other components in the rear of the combine. However, by using the vertical orientation, the spreader must have the capability for simultaneously receiving or inducting both the heavier, bulkier crop residue discharged from the threshing mechanism of the combine, which heavier residue typically includes straw, husks, cobs, stems, and the like and is typically propelled rearwardly by a rapidly rotating and powerful beater or straw walker and is deflected downwardly toward the rear opening of the combine, and the lighter, fluffier, and less bulky chaff which includes pod fragments and the like which are separated by the cleaning system from the grain or other crop and blown much more gently rearwardly toward the rear opening.

More particularly, typically, the straw and other heavier, bulkier crop residue is blown or propelled rearwardly from the threshing region with considerable force, and then is deflected downwardly toward the rear opening. In contrast, the chaff and other crop residue from the cleaning system is propelled much less forcefully, using air flow from a fan, as it is not desired for the grain or other crop, which is relatively lightweight, to be blown out of the rear opening and lost. It is typical to desire for the crop residue to be spread relatively evenly over the swath of the combine as it moves along a field, it being possible for a swath to have an extent of 40 feet or more for some large farming operations. Therefore, for a vertical spreader including two counter-rotating crop accelerating elements, it would be expected for each element to be capable of propelling crop residue a distance equal to about one-half of the combine swath, or up to as much as 20 feet or so, in the instance of the larger combines. To achieve such a propulsion requirement, it is necessary for the rotary accelerating apparatus to be rotated at a relatively high rotational speed. It is also desirable for blades or other impellers of the rotary accelerating apparatus to be sufficiently large for handling anticipated volumes of crop residue, particularly the bulkier material from the thresher. However, vertical crop residue spreaders including rapidly rotating rotary accelerating apparatus having such relatively large blades have been found to generate an undesirable back pressure condition forwardly of the blades in the region for receiving and inducting the chaff from the cleaning system, which results in a build-up of crop residue in that region and even blow back of crop residue into the cleaning system area. Also, a less than desirable degree or level of rearward flow of air through the rear opening of the combine may be achieved, which can cause an undesirable dust buildup in the more forward chassis region of the combine.

Still another variable to be factored when using a vertical spreader which is not as problematic for a horizontal spreader is the size and rearward extent of the rear wheels of the combine. That is, some combines have driven rear wheels and/or may be larger machines so as to require larger rear wheels that extend rearwardly to beside the rear opening of the combine. As a result, for the sideward discharge of the spreader to pass the larger rear wheels it may be required to tilt the spreader rearwardly to an orientation at an angle to vertical. This can result in at least the lower portion of the spreader being located farther rearwardly of or in the rear opening, such that desired air and chaff flow characteristics into the spreader are more difficult to achieve.

Thus, what is sought is apparatus that overcomes the problems, shortcomings and disadvantages set forth above.

SUMMARY OF THE INVENTION

What is disclosed is rotary accelerating apparatus for a vertical crop residue spreader of an agricultural combine, that is capable of receiving, combining and accelerating a relatively high velocity of voluminous flow of relatively heavy, bulky crop residue including straw and the like deflected downwardly from the thresher of the combine, and a weaker, less voluminous flow of chaff and air from the cleaning system of the combine located forwardly of the spreader, by generating a negative pressure or suction condition in the vicinity of the chaff flow for overcoming any undesirable back pressure condition that interferes with induction of the crop residue flow from the cleaning system and which facilitates air flow through the chassis region of the combine to reduce conditions leading to undesirable dust buildup and other problems.

According to one aspect of the invention, the rotary crop residue accelerating apparatus includes a rotatable member mountable in an upwardly and forwardly open housing of the spreader for rotation therein in a predetermined rotational direction about a forwardly and rearwardly extending rotational axis oriented generally horizontally or at a small acute angle to horizontal and extending through a center of the rotatable member. The apparatus includes a plurality of blades connected to and supported by the rotatable member at angularly spaced locations around the rotational axis, respectively, for rotation with the rotatable member within the housing adjacent to a forwardly and upwardly facing opening thereof through which a downwardly directed first flow of crop residue is to be received, each of the blades having a surface oriented to face in the rotational direction for propelling and accelerating the crop material flow through and from the housing, and each of the blades including a forward surface portion disposed to rotate adjacent to a forwardly facing portion of the opening through which a second flow of crop material is to be received, the first surface portion including a radial outer tip portion that extends radially outwardly and forwardly from the blade and has a shape and orientation which during the rotation will generate a negative pressure condition in a region forwardly of the forwardly facing opening of the housing for inducting the second flow into the housing therethrough.

According to a preferred aspect of the invention the radial outer tip portion of each of the blades is curved or bent so as to extend forwardly in the rotational direction and terminates at an edge portion spaced in the rotational direction from the surface of the blade. According to another preferred aspect the radial outer tip portion of each of the blades includes a radially inner edge portion which tapers forwardly and radially outwardly to a forwardmost edge portion of the outer tip portion. According to another aspect the radial outer tip portion adjacent to the edge portion or the edge portion itself is oriented at an acute angle relative to the rotational direction greater than zero and less than about 40 degrees and more preferably at an angle from about 30 to about 40 degrees relative to the rotational direction.

BRIEF DESCRIPTION OF THE DRAWINGS

FIG. 6 is an enlarged side view of the accelerating apparatus of FIG. 5B;

FIG. 7 is a rear perspective view of the accelerating apparatus of FIG. 5B; and

DETAILED DESCRIPTION OF THE INVENTION

Figure 1:
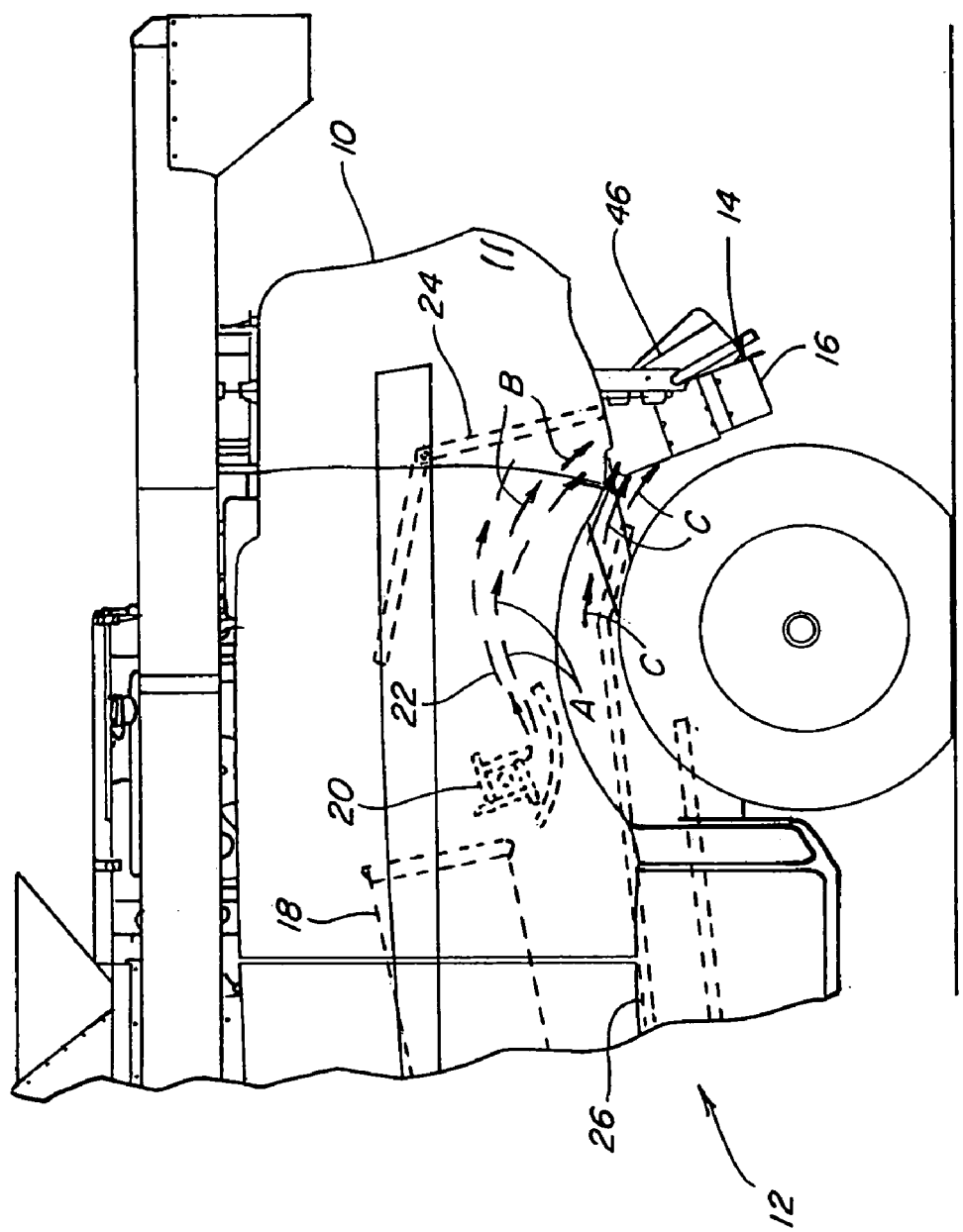
FIG. 1 is a fragmentary, simplified representation of a rear end of an agricultural combine, including a vertical straw and chaff spreader including rotary accelerating apparatus according to the present invention.

Referring now to the drawings, wherein preferred embodiments of the present invention are shown, in FIG. 1, a rear end 10 of a typical self-propelled agricultural combine 12 is shown, including a rotary crop residue spreader 14 including rotary crop residue accelerating apparatus 16 constructed and operable according to the teachings of the present invention. Briefly, combine 12 includes a threshing mechanism 18 which separates straw, including stalks, cobs, stems, weeds and other larger plant matter, from the harvested crop, and feeds that material to a rotating straw walker or beater mechanism 20 which carries or propels a flow 22 of the straw rearwardly, denoted by arrows A through an internal duct of combine 12 and against a deflector plate 24, which helps deflect the flow 22 downwardly, denoted by arrows B, into spreader 14. At the same time, cleaning apparatus 26 of combine 12 separates chaff, such as seed pods and husks, from the threshed grain, using a rearwardly and upwardly directed flow of air from a forwardly located fan (not shown) and blows and directs a flow of the air and chaff, denoted by arrows C, rearwardly toward spreader 14.

Figure 2:
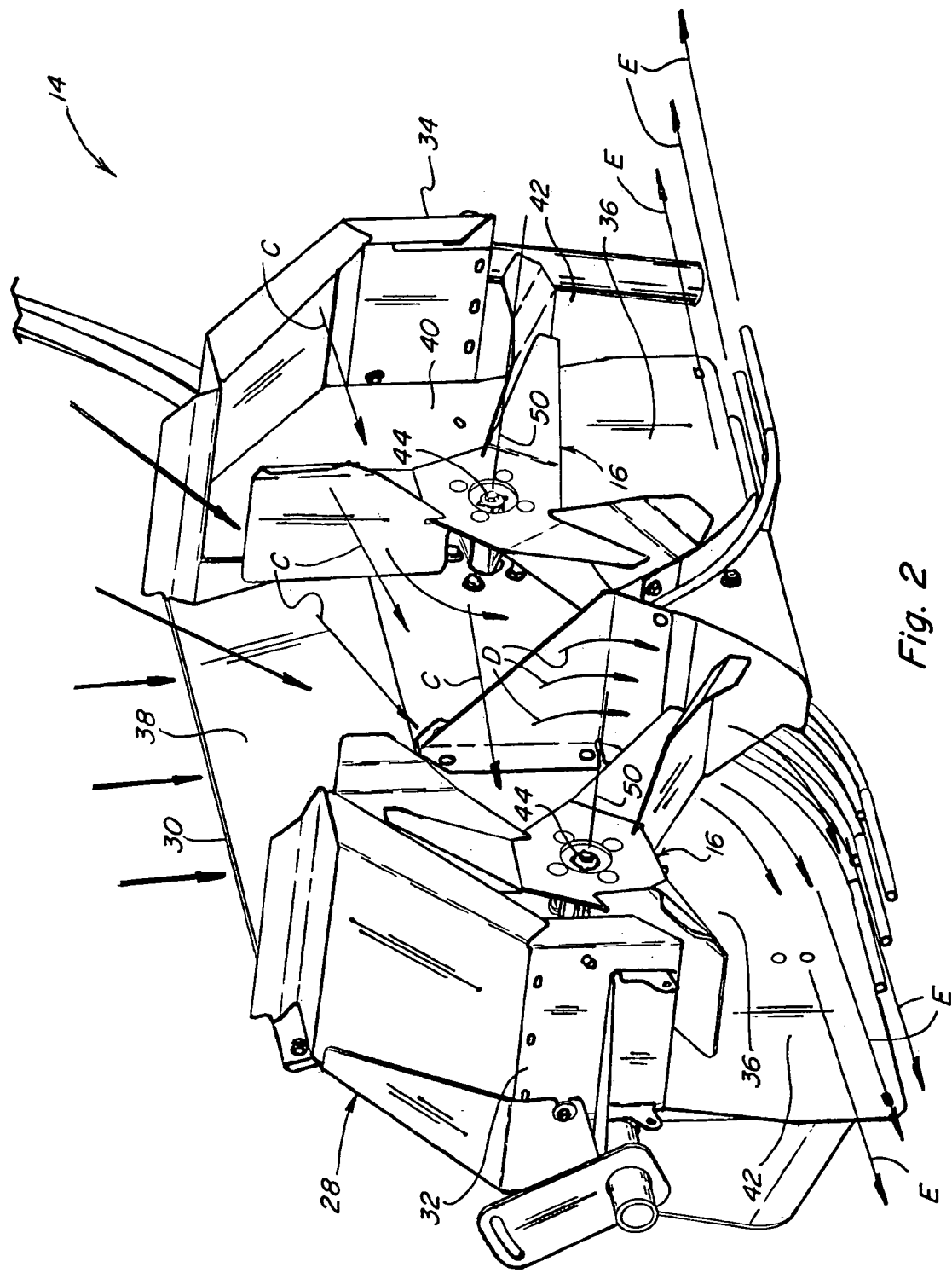
FIG. 2 is an enlarged fragmentary perspective view of the spreader and rotary accelerating apparatus of FIG. 1, illustrating crop residue flow into and out of the spreader.
Figure 3:
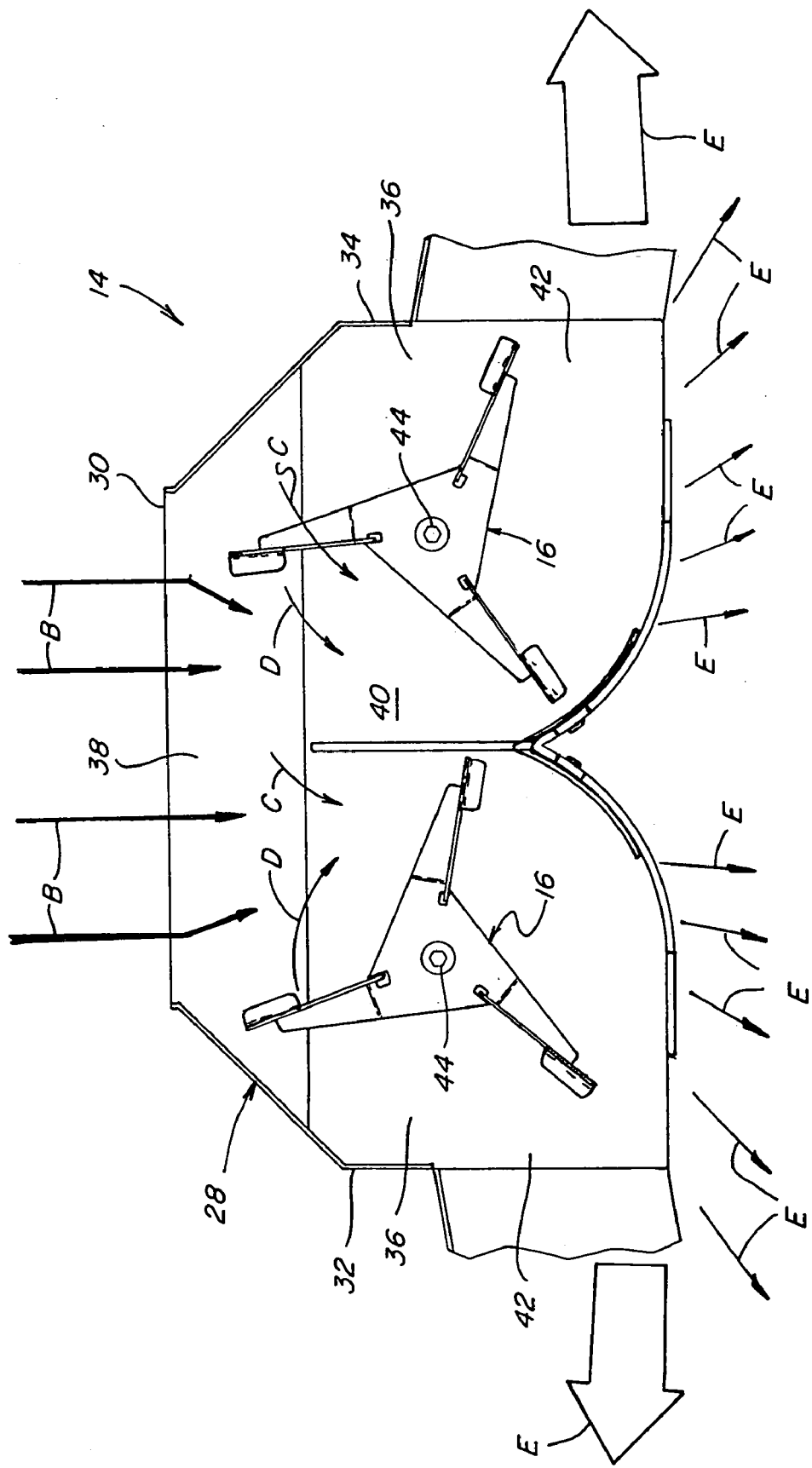
FIG. 3 is a front view of the spreader and rotary accelerating apparatus of FIG. 1, showing crop residue flow.

Referring also to FIGS. 2 and 3, wherein only spreader 14 is shown, spreader 14 includes a housing 28 having a rear wall 30 and side walls 32 and 34, defining and partially enclosing a pair of side-by-side spaces 36, each including a crop residue accelerating apparatus 16 for rotation therein in a predetermined rotational direction, as denoted by arrows D. Housing 28 defines an upwardly and forwardly open inlet region 38 positioned to receive the generally downwardly extending flow of straw, denoted by arrows B, and a forwardly and upwardly open region 40 positioned for receiving the forward to rearward flow of chaff, denoted by arrows C, such that rotation of crop residue accelerating apparatus 16 in the rotational directions D will accelerate and discharge the flows through opposite sidewardly facing openings 42, as denoted by arrows E. Each crop residue accelerating apparatus 16 is mounted on a rotatable shaft 44 for rotation therewith, each shaft 44 extending through an opening in rear wall 30 and being drivingly connected to a motor 46, which can be, for instance, an electric motor, fluid motor, or the like (FIG. 1), operable for rotating shaft 44 and crop residue accelerating apparatus 16 for accelerating and propelling or discharging the crop residue, as denoted by arrows E, a desired distance from spreader 14.

Figure 4:
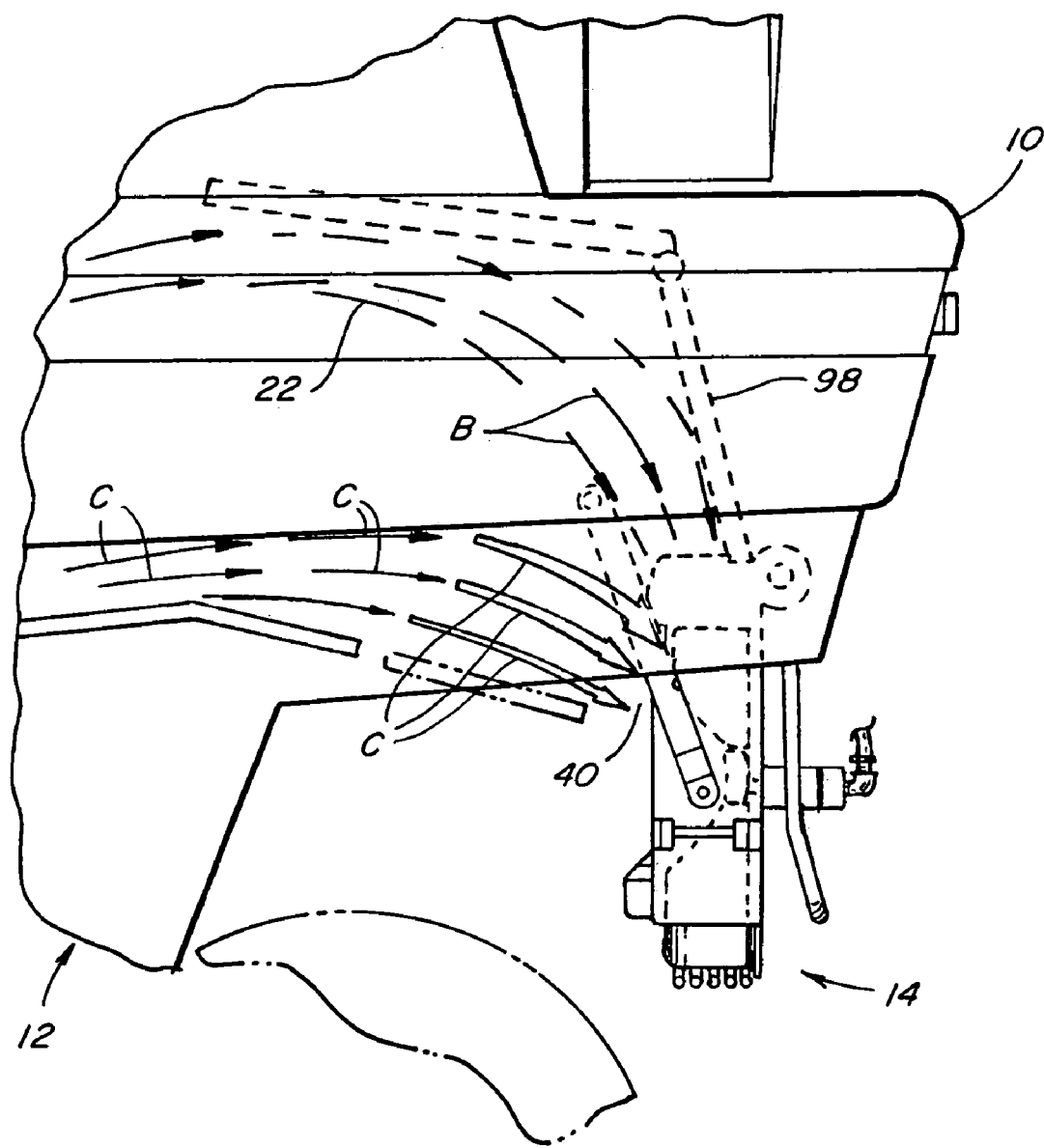
FIG. 4 is an enlarged fragmentary side representation of the rear end of the combine and the spreader of FIG. 1, illustrating crop residue flow into the spreader.

In FIG. 4, rear end 10 of combine 12 is shown, to better illustrate crop residue flow to spreader 14. Here, the downward direction of flow 22, denoted by arrows B is better shown, as is the rearward flow, denoted by arrows C of the chaff. The more rearward of arrows C adjacent to spreader 14 are shown as enlarged relative to the more forwardly located arrows C. This is to represent the improved induction of the chaff flow into spreader 14, as achieved by the improved design of rotary accelerating apparatus 16 according to the present invention, as will be explained.

Figure 5A:
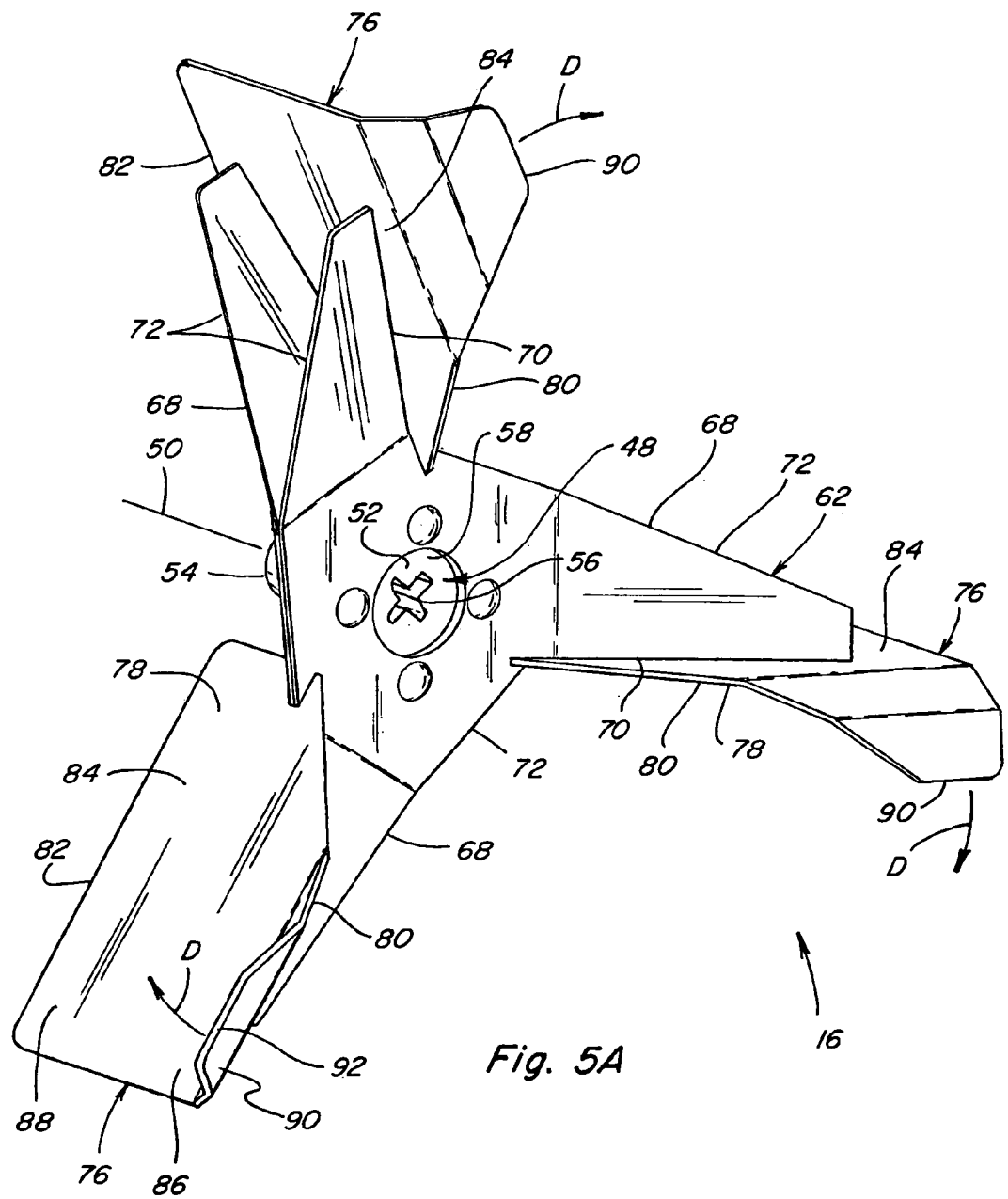
FIG. 5A is a perspective view of rotary accelerating apparatus of FIG. 1.
Figure 5B:
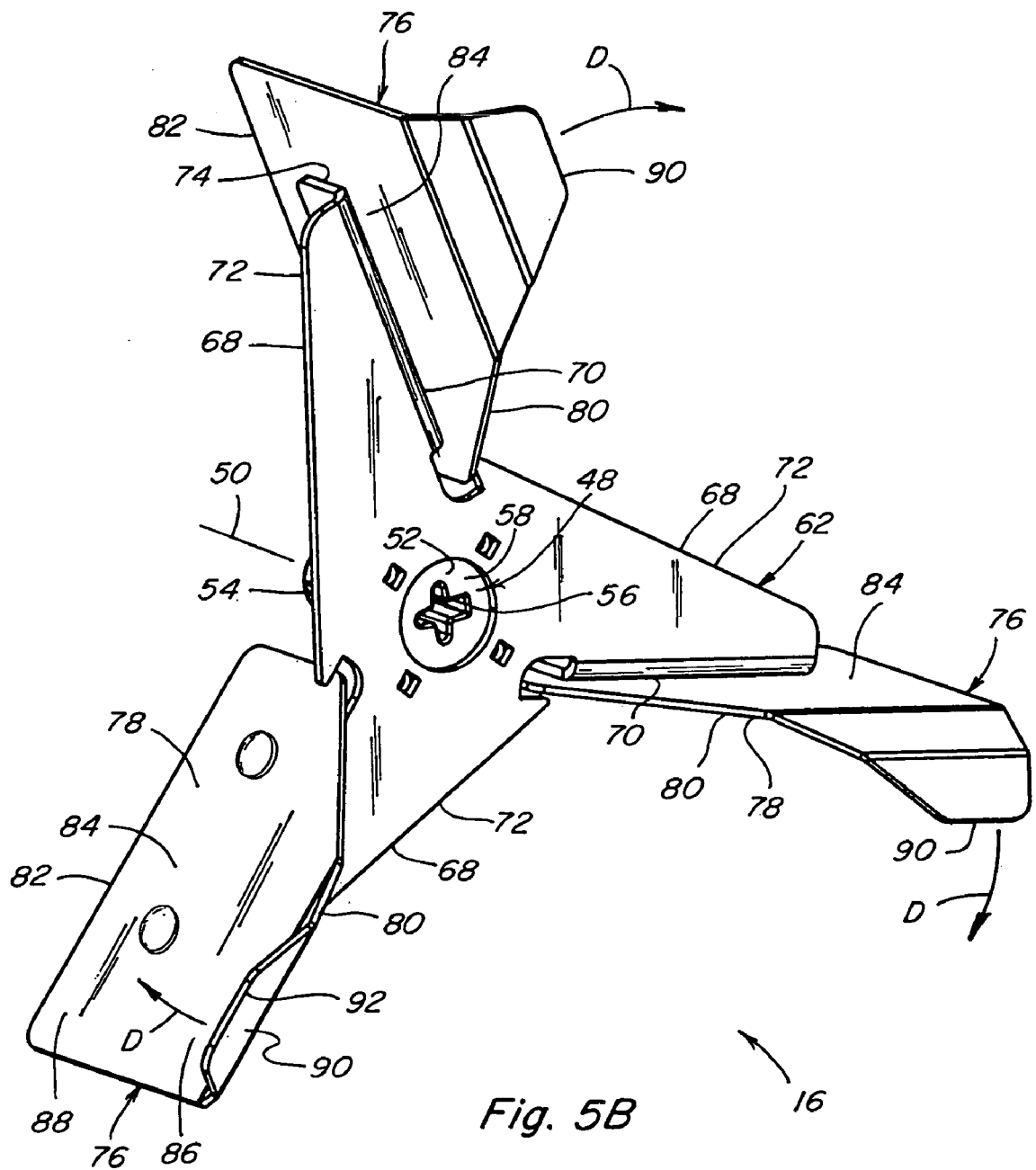
FIG. 5B is a perspective view of an alternative rotary accelerating apparatus of the invention.

Referring also to FIG. 5A, which shows the crop residue accelerating apparatus 16 of FIGS. 1–4, and FIGS. 5B, 6 and 7, which show an alternative embodiment of the crop residue accelerating apparatus 16, each apparatus 16 includes a central hub 48 which mounts on shaft 44 for rotation therewith in the rotational direction D (FIGS. 2 and 3), about a rotational axis 50 of shaft 44. Hub 48 is preferably a tubular or hollow cylindrical or similar shape member including a first axial end portion 52, a second axial end portion 54 axially spaced from and opposite axial end portion 52, and an axial hole 56 at least partially through hub 48 for receiving shaft 54. First axial end portion 52 preferably includes a radially outwardly extending annular flange 58 therearound, supported by a plurality of axially extending ribs 60 connected to flange 58 and hub 48 at angularly spaced locations therearound. A blade support member 62, preferably of sheet metal construction, is mounted to flange 58 of first axial end portion 52 of hub 48 in a suitable manner such as by a plurality of bolts 64 which pass through holes in flange 58 and member 62, and which are secured by nuts 66, for rotation with hub 48 about rotational axis 50. Member 62 preferably extends at least substantially around hub 48 and includes a plurality of arms 68 located at angularly spaced locations around axis 50 and extending radially outwardly relative to hub 48. In the embodiment shown in FIG. 5A there is a pair of arms 68 at each angularly spaced location, one arm 68 being oriented so as to extend at a forwardly directed angle relative to axis 50, and one arm 68 being oriented to extend at a rearwardly directed angle. In the embodiment shown in FIGS. 5B, 6 and 7, in contrast, only a single arm 68 is utilized at each location. Each arm 68 preferably has a generally radially outwardly extending leading edge portion 70, and a trailing edge portion 72 which is angularly related to leading edge portion 70. In the embodiment of FIGS. 5B, 6 and 7, each leading edge portion 70 includes an elongate tab 74 oriented so as to have a surface facing the rotational direction.

A blade 76 is suitably mounted to the arm or arms 68 at each location around hub 48 so as to extend radially outwardly and forwardly relative to hub 48. In the embodiment of FIG. 5A, blades 76 are shown welded to arms 68, whereas in the embodiment of FIGS. 5B, 6 and 7, blades 76 are attached by a plurality of bolts 64 which pass through holes in tabs 74 and are secured by nuts 66. In both embodiments, either bolts or welds can be used for attachment. Each blade 76 has a surface 78 oriented to face in the rotational direction (arrows D) and including a first axial edge 80, and a second axial edge 82 opposite edge 80, edges 80 and 82 extending generally radially outwardly relative to rotational axis 50, and each blade 76 including an intermediate or mounting portion 84 preferably located intermediate or in spaced relation between edges 80 and 82.

Surface 78 of each blade 76 is relatively large and includes a first surface portion 86 extending from first axial edge 80 generally or about to mounting portion 84, and a second surface portion 88 extending generally or about from mounting portion 84 to second axial edge 82. First surface portion 86 is positioned to be in the downward path of the flow of straw denoted by arrows B (FIGS. 1–4) and also in or just rearwardly of region 40 (FIGS. 2–4) so as to be in or adjacent to the rearward flow of chaff denoted by arrows C. Second surface portion 88 is positioned to be directly in the downward path of the flow of straw denoted by arrows B.

As a result of the relatively large extent of blades 76, the relatively fast rotational speed of rotation, and the volume and force of the downward straw flow denoted by arrows B, it has been observed that back pressure can be generated in region 40 (FIGS. 2–4) forwardly of accelerating apparatus 16, which back pressure can be sufficient to inhibit and significantly reduce the chaff and air flow denoted by arrows C into spreader 14. As a result, the chaff and other crop residue can build up in the area of the rear opening of the combine, thereby reducing the efficiency of the cleaning system, and the intended spreading function of spreader 14. Additionally, it is desirable to have a forward to rearward flow of air through the chassis region of the combine for cooling and dust control purposes, which flow is also reduced or inhibited by the back pressure conditions, and can result in dust buildup on surfaces in the chassis.

To counter this problem, first surface portion 86 of each blade 76 has a forward radial outer tip portion 90 thereof which, importantly, during rotation of the crop residue accelerator 14 counteracts and eliminates the positive pressure or back pressure condition generated by blades 76, and instead, generates a negative pressure or suction condition in region 40. As a result, instead of inhibiting or rejecting the chaff flow C, the shape of blades 76 function as a fan or impeller for positively inducting or pulling the chaff and air flow into the path of blades 76. This is achieved by the shape and orientation of outer tip portion 90. Tip portion 90 has a gently angled or curved shape which extends forwardly and toward the direction of rotation D from surface portion 86 to a radially extending outermost edge portion 92 spaced from surface portion 86 in the direction of rotation D. Edge portion 92 of tip portion 90 is preferably oriented at a small acute angle to the rotational direction as determined in the vicinity of the respective tip portion 90 so as to generate a rearward air flow during the rotation, which angle can be within a range of from just a few degrees to up to about 40 degrees, depending on the conditions of a particular application.

As a result, the lighter flow of chaff denoted by arrows C inducted into the path of the rotating blades 76 by the negative pressure condition generated by tip portions 90 is mixed with the flow of the heavier straw. The large axial and radial outward extents of blades 76, provides a large surface area for receiving the straw and chaff for mixing them and accelerating the mix outwardly from spreader 14 in a relatively wide discharge pattern for distributing it over a desirably large area of a field.

The construction of blades 76 and the attachment to arm or arms 68 also results in a favorable resultant force loading on blades 76 and distribution or transfer of the force loads to arms 68. More particularly, blades 76 are shaped and sized, and mounting portions 84 thereof are located, such that the flow of straw denoted by arrows B, which is relatively heavy and powerful, is directed more toward and propelled by the stronger and better supported region of each blade 76 which primarily includes second surface portion 88 and mounting portion 84. In this regard, it should be observed that the single or pair of arms 68 are generally aligned with about the center of the path of the heavier flow of straw. In the embodiment of FIG. 5A, the use of a pair of angularly related arms 68, one of which extends more forwardly, provides better support for the forwardly located first surface portion 86 and tip portion 90 of the blade. In the embodiment of FIGS. 5B, 6 and 7, the central region 96 of second surface portion 88 of each blade 76 is backed up and supported by tab 74 of arm 68. In both mounting arrangements the result is to advantageously strengthen central region 96 and better transfer resulting loads thereon to arm or arms 68. It should also be noted that rear wall 30 of housing 28 includes an optional deflector plate 98 positioned for deflecting or guiding more rearwardly located portions of the flow of straw B forwardly toward blades 76.

Second axial edges 82 of blades 76 are positioned in sufficiently close axially spaced relation to deflector plate 98 (FIG. 4 and rear) wall 30 such that apparatus 16 is able to contact and carry the straw into space 36 such that the straw has less of a tendency to build up in the rear regions of spreader 14. Still further, it should be noted that the extent of blade support members 62 between adjacent ones of blades 76 provides at least a partial barrier to keep longer plant material from wrapping around blades 76 and hub 48.

Figure 8:
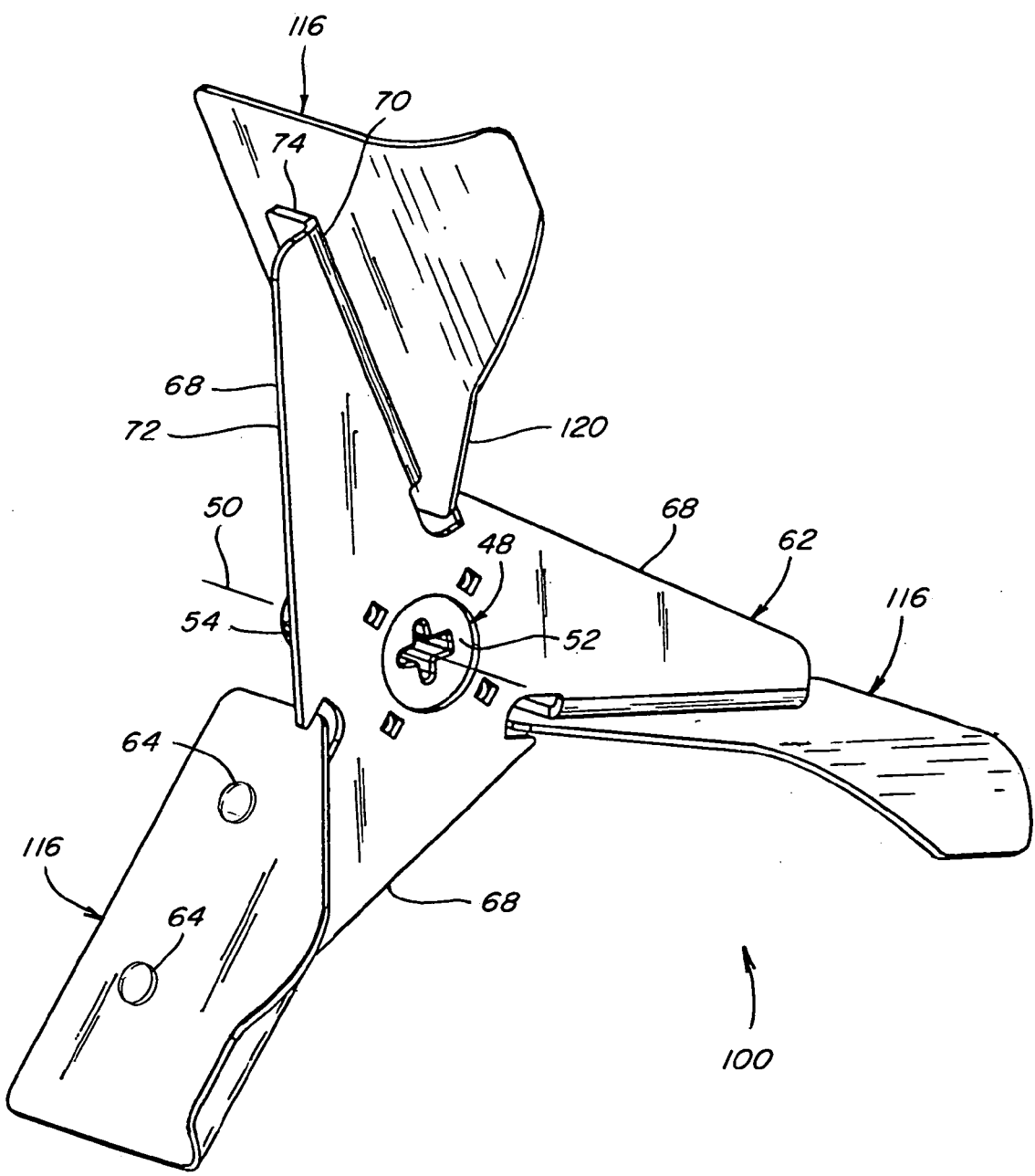
FIG. 8 is an enlarged perspective representation of another rotary accelerating apparatus of the invention.

Referring to FIG. 8, another rotary crop accelerating apparatus 100 constructed and operable according to the teachings of the present invention is shown, like parts of accelerating apparatus 100 and apparatus 16 being identified by like numbers. Crop residue accelerating apparatus 100 includes a central hub 48 which mounts on a shaft of a motor 46 (FIG. 1) which can be, for instance, an electric motor, fluid motor, or the like, operable for rotating the shaft and crop residue accelerating apparatus 100 in a rotational direction, denoted by arrows D (FIGS. 2 and 3) for accelerating and propelling or discharging the crop residue a desired distance from spreader 14 as denoted by arrows E (FIG. 2. H*ub*) 48, again, is preferably a tubular or hollow cylindrical or similar shape member including a first axial end portion 52, a second axial end portion 54 axially spaced from an opposite axial end portion 52, and an axial hole (not shown) for receiving the shaft of motor 46. Also as before, first axial end portion 52 of hub 48 includes a radially outwardly extending annular flange 58 therearound (FIGS. 6 and 7), supported by a plurality of axially extending ribs 60 connected to flange 58 and hub 48 at angularly spaced locations therearound. A generally planar or flat blade support member 62 is mounted to flange 58, again in a suitable manner, such as by a plurality of bolts for a rotation with hub 48 about a rotational axis 50. Member 62 preferably extends at least substantially around hub 48, and includes a plurality of arms 68 located at angularly spaced locations around axis 50 and extending radially outwardly relative to hub 48. Accelerating apparatus 100 is shown including the arm configuration of FIG. 5A wherein only a single arm 68 is utilized at each location around hub 48, but the dual arm configuration of FIGS. 5B, 6 and 7 could alternatively be used. Again, each arm 68 preferably has a generally radially outwardly extending leading edge portion 70, and a trailing edge portion 72 which is angularly related to leading edge portion 70. Each leading edge portion 70 includes an elongate tab 74 oriented so as to have a surface facing the rotational direction. A blade 116 is mounted to each arm 68 so as to extend radially outwardly relative to hub 48, preferably by a plurality of bolts 64 secured by nuts or the like. Each blade 116 has a surface 78 oriented to face in the rotational direction (arrows D in FIG. 2 and including) a first axial edge 80, and a second axial edge 82 opposite edge 80, edges 80 and 82 extending generally radially outwardly relative to rotational axis 50, and each blade 116 including an intermediate or mounting portion 84 preferably located intermediate or in spaced relation between edges 80 and 82.

Surface 78 of each blade 116 includes a first surface portion 86 extending from first axial edge 80 generally or about to mounting portion 84, and a second surface portion 88 extending generally or about from mounting portion 84 to second axial edge 82, first surface portion 86 being positioned generally or primarily adjacent to the path of the flow of chaff and air denoted by arrows C (FIGS. 1–4), and a second surface portion 88 being positioned primarily in the path of the flow of straw, denoted by arrows B. First surface portion 86 of each blade 116 has a forward radial outer tip portion 118 thereof which is gradually curved or bent such that a radially extending outermost edge portion 92 thereof is oriented at small acute angle relative to the rotational direction within the above range, which is important for achieving the operational benefits set forth above, namely, the generation of a negative pressure condition or suction in region 40 for drawing or inducting chaff and air flow C into the path of blades 116.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Rotary crop residue accelerating apparatus for a vertical side discharge crop residue spreader for an agricultural combine, comprising:
   a rotatable member mountable in an upwardly and forwardly open housing of the spreader for rotation therein in a predetermined rotational direction about a generally forwardly and rearwardly extending rotational axis through a center of the rotatable member; and
   a plurality of blades connected to and supported by the rotatable member at angularly spaced locations around the rotational axis, respectively, for rotation with the rotatable member within the housing adjacent to a forwardly and upwardly facing opening thereof through which a downwardly directed first flow of crop residue is to be received, each of the blades having a surface oriented to face in the rotational direction for propelling and accelerating the crop material flow through and from the housing, and each of the blades including a forward surface portion disposed to rotate adjacent to a forwardly facing portion of the opening through which a second flow of crop material is to be received, the first surface portion including a radial outer tip portion that extends radially outwardly and forwardly from the blade and has a shape and orientation which during the rotation will generate a negative pressure condition in a region forwardly of the forwardly facing opening of the housing for inducting the second flow into the housing therethrough.

2. Rotary crop residue accelerating apparatus of claim 1, wherein the radial outer tip portion of each of the blades is curved or bent so as to extend forwardly in the rotational direction and terminates at an edge portion spaced in the rotational direction from the surface of the blade.

3. Rotary crop residue accelerating apparatus of claim 1, wherein the radial outer tip portion of each of the blades includes a radially inner edge portion which tapers forwardly and radially outwardly to a forwardmost edge portion of the outer tip portion.

4. Rotary crop residue accelerating apparatus of claim 1, wherein the radial outer tip portion of each of the blades is curved or bent so as to extend forwardly in the rotational direction and terminates at an edge portion spaced in the rotational direction from the surface of the blade and oriented at an acute angle relative to the rotational direction greater than zero and less than about 40 degrees.

5. Rotary crop residue accelerating apparatus of claim 4, wherein the edge portion is oriented at from about a 30 to 40 degree angle relative to the rotational direction.

6. Rotary crop residue accelerating apparatus for a crop residue spreader of an agricultural combine, the spreader including a forwardly and upwardly open enclosure for receiving a downward flow of straw from threshing apparatus of the combine and a lower, rearward flow of lighter chaff and air from a cleaning system of the combine, the crop residue accelerating apparatus comprising:

a hub mountable on a rotatable member of the spreader for rotation therewith in a predetermined rotational direction about a generally forwardly and rearwardly extending rotational axis;

a plurality of blades connected to and supported by the hub at angularly spaced locations around the axis, respectively, for rotation with the hub, each of the blades having a surface oriented to face in the rotational direction including a forward surface portion, a rearward surface portion, and a mounting portion therebetween, the forward surface portion terminating at a forward axial edge that extends radially outwardly and forwardly from about the hub to a forwardly extending radial outer tip portion, the radial outer tip portion having a curve or angled shape so as to extend forwardly and toward the rotational direction and terminating at an edge portion spaced in the rotational direction from the surface of the blade, for generating a negative pressure condition in a region located immediately forwardly of the blade when rotated in the rotational direction for inducting the rearward flow of chaff and air into a path of rotation of the blades so as to mix with the flow of straw and be accelerated by the rotating blades through and radially outwardly from the spreader.

7. Rotary crop residue acceleration apparatus of claim 6, wherein the radial outer tip portion of each of the blades includes a radially inner edge portion which tapers forwardly and radially outwardly to a forwardmost edge portion of the outer tip portion.

8. Rotary crop residue accelerating apparatus of claim 6, wherein the radial outer tip portion adjacent to the edge portion thereof is oriented at an acute angle relative to the rotational direction greater than zero and less than about 40 degrees.

9. Rotary crop residue accelerating apparatus of claim 8, wherein the radial outer tip portion adjacent to the edge portion is oriented at from about a 30 to 40 degree angle relative to the rotational direction.

10. A vertical crop residue spreader for an agricultural combine, comprising:

a housing having a forwardly and upwardly facing opening for receiving a downward flow of straw from threshing apparatus of the combine and a lower, rearward flow of lighter chaff and air from a cleaning system of the combine;

at least one crop residue accelerating apparatus supported for rotation within the housing, the crop residue accelerating apparatus including a central hub drivingly rotatable in a predetermined rotational direction about a rotational axis therethrough oriented generally horizontally or at a small acute angle to horizontal;

a plurality of blades connected to and supported by the hub at angularly spaced locations around the axis, respectively, for rotation with the hub, each of the blades having a surface oriented to face in the rotational direction including a forward surface portion, a rearward surface portion, and a mounting portion therebetween, the forward surface portion terminating at a forward axial edge that extends radially outwardly and forwardly from about the hub to a forwardly extending radial outer tip portion, the radial outer tip portion being curved or angled so as to extend forwardly and toward the rotational direction and terminating at an edge portion spaced in the rotational direction from the surface of the blade, for generating a negative pressure condition in a region located immediately forwardly of the blade when rotated in the rotational direction for inducting the rearward flow of chaff and air into a path of rotation of the blades so as to mix with the flow of straw and be accelerated by the rotating blades through and radially outwardly from the spreader.

11. The spreader of claim 10, wherein the radial outer tip portion of each of the blades of the crop residue accelerating apparatus includes a radially inner edge portion which tapers forwardly and radially outwardly to a forwardmost edge portion of the outer tip portion.

12. The spreader of claim 10, wherein the radial outer tip portion adjacent to the edge portion of each of the blades is oriented at an acute angle relative to the rotational direction greater than zero and less than about 40 degrees.

13. The spreader of claim 12, wherein the radial outer tip portion adjacent to the edge portion is oriented at from about a 30 to 40 degree angle relative to the rotational direction.

* * * * *